(12) United States Patent
Nam et al.

(10) Patent No.: US 12,082,013 B2
(45) Date of Patent: Sep. 3, 2024

(54) PDCCH MONITORING CAPABILITY INDICATION PER SEARCH SPACE SET GROUP

(71) Applicant: QUALCOMM Incorporated, San Diego, CA (US)

(72) Inventors: Wooseok Nam, San Diego, CA (US); Jing Sun, San Diego, CA (US); Xiaoxia Zhang, San Diego, CA (US); Tao Luo, San Diego, CA (US); Ahmed Abdelaziz Ibrahim Abdelaziz Zewail, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/455,409

(22) Filed: Nov. 17, 2021

(65) Prior Publication Data

US 2022/0232401 A1    Jul. 21, 2022

Related U.S. Application Data

(60) Provisional application No. 63/138,359, filed on Jan. 15, 2021.

(51) Int. Cl.
*H04W 24/08* (2009.01)
*H04W 72/0446* (2023.01)
(Continued)

(52) U.S. Cl.
CPC ....... *H04W 24/08* (2013.01); *H04W 72/0446* (2013.01); *H04W 72/23* (2023.01); *H04W 72/51* (2023.01)

(58) Field of Classification Search
None
See application file for complete search history.

(56) References Cited

U.S. PATENT DOCUMENTS

| 2019/0215098 A1* | 7/2019 | Tiirola | H04W 24/08 |
| 2020/0221379 A1* | 7/2020 | Choi | H04L 5/0044 |

(Continued)

FOREIGN PATENT DOCUMENTS

| WO | 2020032773 A1 | 2/2020 |
| WO | 2020246858 A1 | 12/2020 |

OTHER PUBLICATIONS

International Search Report and Written Opinion—PCT/US2021/063891—ISA/EPO—Apr. 13, 2022.

*Primary Examiner* — Alpus Hsu
*Assistant Examiner* — Camquyen Thai
(74) *Attorney, Agent, or Firm* — QUALCOMM Incorporated

(57) ABSTRACT

A user equipment (UE) transmits, to a base station, an indication of a capability for physical downlink control channel (PDCCH) monitoring. The UE receives, from the base station, a configuration of a plurality of search space set groups based on the capability. The apparatus then monitors PDCCH candidates for a PDCCH from the base station based on a search space set group and the configuration. A base station receives, from a UE, an indication of a capability for PDCCH monitoring and transmits, to the UE, a configuration of a plurality of search space set groups based on the capability. The apparatus transmits a PDCCH to the UE based on the search space set group and the configuration associated with the search space set group.

29 Claims, 9 Drawing Sheets

(51) Int. Cl.
*H04W 72/23* (2023.01)
*H04W 72/51* (2023.01)

(56) References Cited

U.S. PATENT DOCUMENTS

| | | | |
|---|---|---|---|
| 2020/0351681 A1* | 11/2020 | Salah | H04W 72/23 |
| 2021/0029726 A1* | 1/2021 | Papasakellariou | H04W 72/535 |
| 2021/0037607 A1* | 2/2021 | Hamidi-Sepehr | H04W 24/08 |
| 2021/0144717 A1* | 5/2021 | Tsai | H04W 8/24 |
| 2021/0250153 A1* | 8/2021 | Lin | H04W 72/0446 |
| 2021/0320821 A1 | 10/2021 | Lee et al. | |
| 2021/0321482 A1* | 10/2021 | Oteri | H04W 72/21 |
| 2022/0022221 A1* | 1/2022 | Papasakellariou | H04L 1/0072 |
| 2022/0086894 A1* | 3/2022 | Papasakellariou | H04W 72/23 |
| 2022/0303961 A1* | 9/2022 | Wu | H04W 72/23 |

* cited by examiner

PDCCH MONITORING CAPABILITY INDICATION PER SEARCH SPACE SET GROUP

CROSS REFERENCE TO RELATED APPLICATION(S)

This application claims the benefit of and priority to U.S. Provisional Application Ser. No. 63/138,359, entitled "PDCCH Monitoring Capability Indication Per Search Space Set Group" and filed on Jan. 15, 2021, which is expressly incorporated by reference herein in its entirety.

TECHNICAL FIELD

The present disclosure relates generally to communication systems, and more particularly, to wireless communication including monitoring for a physical downlink control channel (PDCCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. In some aspects, the method may be performed by a user equipment (UE). The apparatus transmits, to a base station, an indication of a capability for PDCCH monitoring and receives, from the base station, a configuration of a plurality of search space set groups based on the capability. The apparatus then monitors PDCCH candidates for a PDCCH from the base station based on a search space set group and the configuration.

In an aspect of the disclosure, a method, a computer-readable medium, and an apparatus are provided for wireless communication. In some aspects, the method may be performed by a base station. The apparatus receives, from a UE, an indication of a capability for PDCCH monitoring and transmits, to the UE, a configuration of a plurality of search space set groups based on the capability. The apparatus transmits a PDCCH to the UE based on the search space set group and the configuration associated with the search space set group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
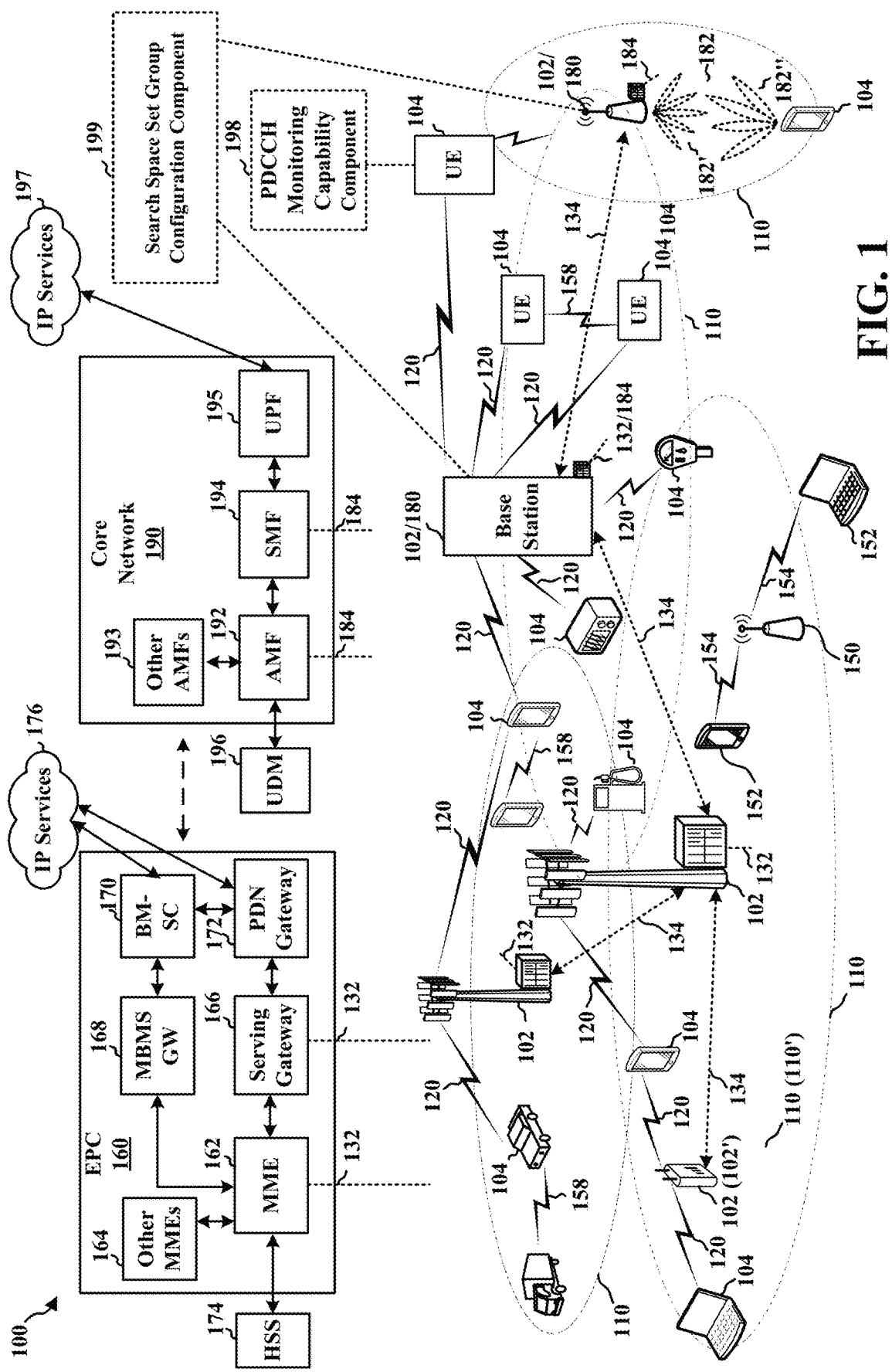
FIG. 1 is a diagram illustrating an example of a wireless communications system and an access network.

A UE may monitor physical downlink control channel (PDCCH) candidates to determine whether the base station has transmitted control signaling (e.g., a PDCCH transmission) to the UE. The UE may be expected to monitor a particular number of PDCCH candidates per unit of time. As one example, the UE may be expected to monitor a maximum number of PDCCH candidates and non-overlapped control channel elements (CCEs) per time unit on an active downlink bandwidth part (BWP) of a serving cell. The time unit may be a single slot, e.g., based on a per slot PDCCH monitoring capability supported by the UE. If the time unit is a single slot, the maximum number of PDCCH candidates and CCEs may be a maximum number of PDCCH candidates and CCEs per slot. The time unit may be a span based time unit having a separation between spans that is less than a slot, e.g., based on a per span PDCCH monitoring capability. If the time unit is based on a span, the maximum number of PDCCH candidates and CCEs may be a maximum number of PDCCH candidates and CCEs per span and the PDCCH monitoring may also be affected by the separation between spans.

Wireless communication in different frequency bands may have different subcarrier spacings (SCS). For example, a larger subcarrier spacing may be used for higher frequency bands. As an example, an SCS of 120 kHz may be used in a lower frequency band, e.g., a 30 GHz carrier frequency, and an SCS of 480 kHz or 960 kHz may be used for a 60 GHz carrier frequency. The larger SCS may provide more robust communication and reduced a phase noise impact for the higher frequency bands. However, a slot length having an inverse relationship to an SCS will be reduced by a same factor that the SCS is increased. The reduced slot length may present a challenge for slot based PDCCH monitoring of PDCCH candidates. Span based PDCCH monitoring having multiple spans within a single slot may present an added challenge for the UE when the slot length is reduced in connection with a larger SCS. The reduced slot length may lead to a reduction in the maximum number of PDCCH candidates or non-overlapped CCEs monitored by the UE per time unit, which may reduce scheduling flexibility for a base station. In some aspects, the UE may apply slot based PDCCH monitoring for a bundle of multiple slots rather than a single slot. The UE may perform a span based PDCCH monitoring having a separation between spans that is longer than a slot length. In some aspects, the UE may be configured for a bandwidth part (BWP) and an associated type of PDCCH monitoring. If the UE switches BWPs, the UE may correspondingly change the type of PDCCH monitoring. A BWP switch may include a delay of approximately 2 ms. The BWP switch delay may span a large number of symbols (e.g., more than 50 or more than 100 symbols) at larger SCS sizes due to the reduced slot length. The BWP switch may lead to an interruption of scheduling for the UE.

Aspects presented herein enable the UE to apply a PDCCH monitoring configuration associated with a search space set group and to switch between PDCCH monitoring configurations (e.g., based on different PDCCH monitoring capabilities) in association with a search space set group switch. A search space set group switch may be faster than a BWP switch and may enable the UE to change PDCCH monitoring without the interruption in service that may be caused by a BWP switch.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102, 180 and UEs 104. The UE 104 may include a PDCCH monitoring capability component 198 configured to transmit, to a base station 102 or 180, an indication of a capability for PDCCH monitoring and to receive, from the base station 102 or 180, a configuration of a plurality of search space set groups based on the capability. The UE may be configured to monitor PDCCH candidates for a PDCCH from the base station 102 or 180 based on a search space set group and the configuration. In certain aspects, the base station 180 may include a search space set group configuration component 199 configured to receive, from a UE 104, an indication of a capability for PDCCH monitoring and to transmit, to the UE 104, a configuration of a plurality of search space set groups based on the capability. The base station may be further configured to transmit a PDCCH to the UE 104 based on the search space set group and the configuration associated with the search space set group. Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 502.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
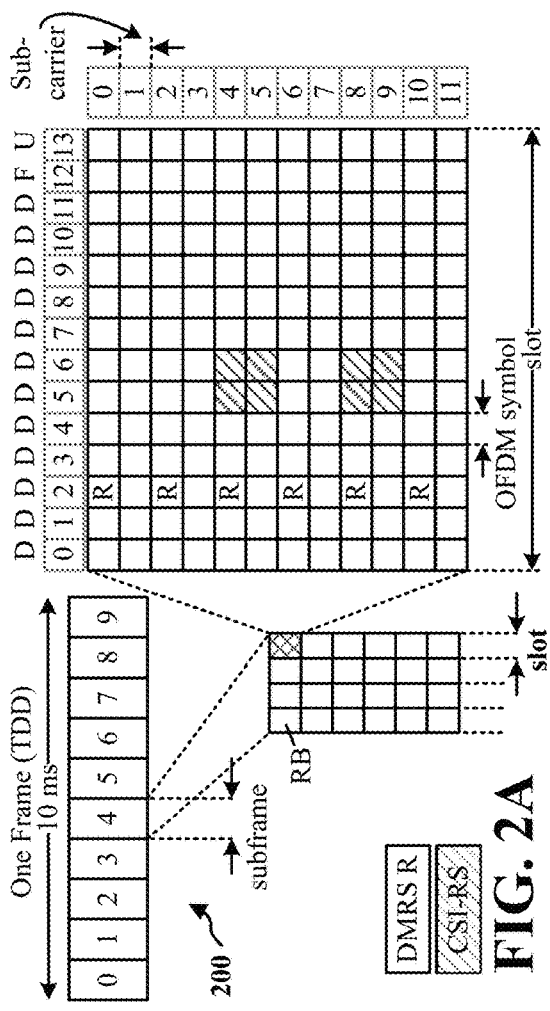
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (e.g., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
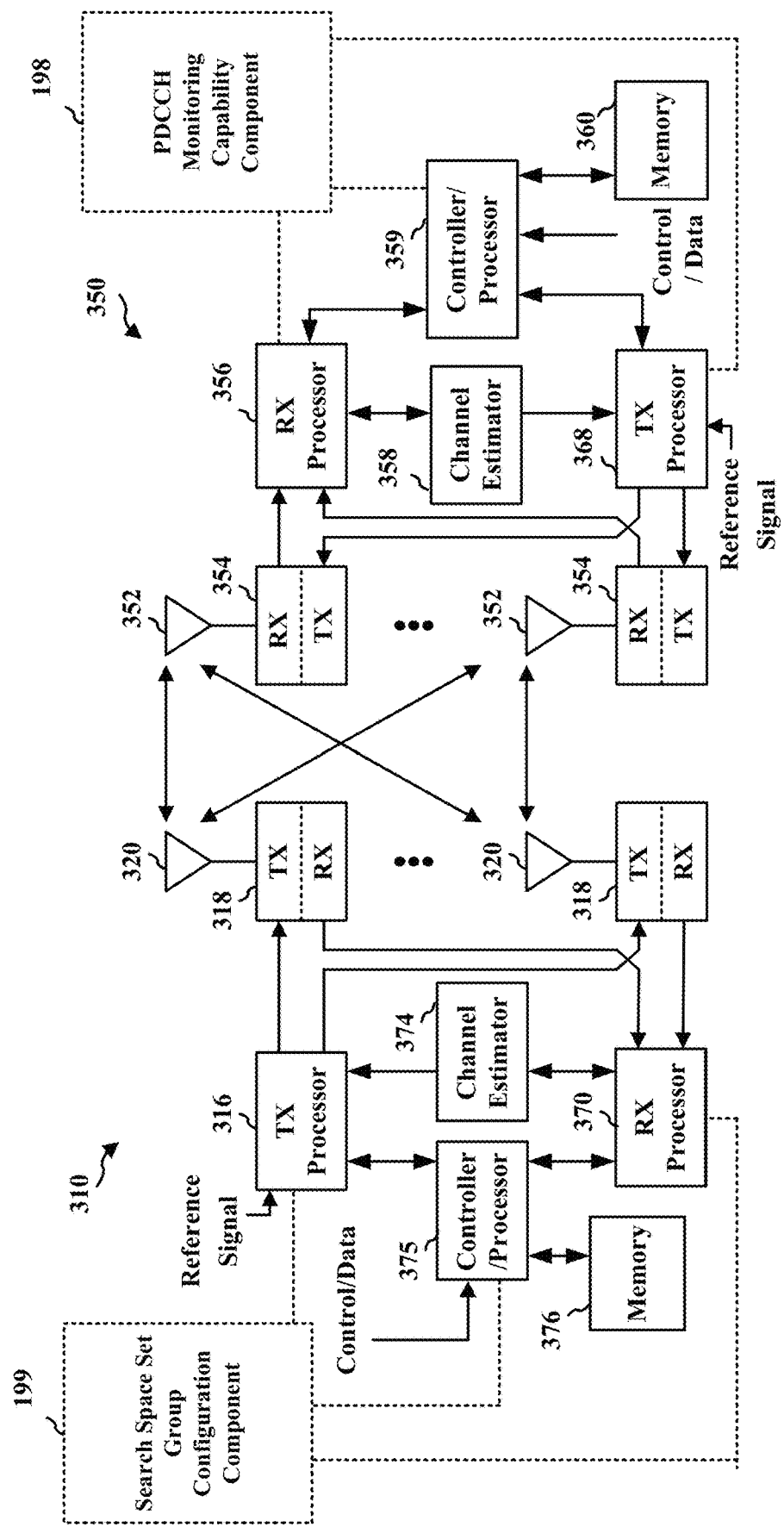
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PDCCH monitoring capability component 198 of FIG. 1, e.g., to transmit, to a base station 102/180, a capability for PDCCH monitoring; to receive, from the base station 102/180, a configuration of a plurality of search space set groups based on the capability; and to monitor PDCCH candidates for a PDCCH from the base station 102/180 based on a search space set group and the configuration.

At least one of the TX processor 316, the RX processor 370, and the controller/processor 375 may be configured to perform aspects in connection with the search space set group configuration component 199 of FIG. 1, e.g., to receive, from the UE 350, a capability for PDCCH monitoring; to transmit, to the UE 350, a configuration of a plurality of search space set groups based on the capability; and to transmit a PDCCH to the UE 350 based on the search space set group and the configuration associated with the search space set group.

A control resource set (CORESET) corresponds to a configurable set of physical resources in time and frequency that a UE uses to monitor for PDCCH/DCI. Each CORESET comprises one or more resource blocks in the frequency domain and one or more symbols in the time domain. The frequency resources of a CORESET may be contiguous or non-contiguous. As an example, a CORESET might comprise multiple RBs in the frequency domain and 1, 2, or 3 contiguous symbols in the time domain. A Resource Element (RE) is a unit indicating one subcarrier in frequency over a single symbol in time. The REs within a CORESET may be organized in RE groups (REGs). An REG may correspond to one RB (e.g., 12 REs) during one OFDM symbol. A Control Channel Element (CCE) may include Resource Element Groups (REGs), e.g., 6 REGs. The REGs within a CORESET may be numbered in increasing order in a time-first manner, starting with 0 for the first OFDM symbol and the lowest-numbered resource block in the control resource set. A UE can be configured with multiple CORESETs, each CORESET being associated with one CCE-to-REG mapping. The CCE-to-REG mapping may be interleaved or non-interleaved. FIG. 4A illustrates an example time and frequency diagram 400 showing multiple bandwidth parts (BWPs), and a CORESET for each BWP. A PDCCH may be carried by 1, 2, 4, 8, or 16 CCEs, e.g., to accommodate different sizes of DCI, different coding rates, etc.

Parameters for a CORESET may be provided by higher layer parameters, e.g., via an RRC parameter. Among others, such CORESET parameters may indicate a duration parameter indicating a length in time, a frequency domain resource parameter, a parameter indicating whether a CCE-to-REG mapping is interleaved or non-interleaved, and/or a REG bundle size comprising a number of REGs, an aggregation level indicating an amount of CCEs allocated for PDCCH, etc.

A UE may be configured to blindly monitor, e.g., attempt to blindly decode, a number of PDCCH candidates of different DCI formats and different aggregation levels. The blind decoding may involve additional processing at a UE but may provide additional flexibility in scheduling and handling of different DCI formats. A search space may refer to resources based on time and frequency where PDCCH may be carried. A search space may indicate an area (e.g., based on time and frequency) within a CORESET for a UE to monitor to detect a specific PDCCH or DCI. Each search space may be associated with one or more radio network temporary identifiers (RNTIs). The size of a search space may be based on an aggregation level. The base station may configure the UE to monitor one or more search spaces, e.g., in radio resource control (RRC) signaling. The UE may perform blind decoding throughout one or more search spaces to attempt to receive PDCCH (e.g., DCI) from a base station. Each possible location of PDCCH within a search space may be referred to as a PDCCH candidate.

A UE may support a PDCCH monitoring capability that has a corresponding maximum number of PDCCH candidates and non-overlapped CCEs that the UE is expected to monitor per time unit on the active DL BWP of a serving cell. The UE may perform PDCCH monitoring based on the corresponding maximum number of PDCCH candidates. The UE may determine a maximum number of PDCCH candidates to monitor per time unit based on an SCS. In some aspects, a correspondence between SCS and the maximum number of PDCCH candidates for PDCCH monitoring per time unit may be indicated in a table.

A first type of PDCCH monitoring capability may be a per slot PDCCH monitoring. For example, the time unit may be a single slot. If the time unit is a single slot, the maximum number of PDCCH candidates corresponds to a maximum number of PDCCH candidates and CCEs that the UE can monitor per slot on the active DL BWP of a serving cell. The positions and separation of the occasions in the slot that the UE monitors the PDCCH candidates may not matter to the UE. Thus, the number of PDCCH candidates and CCEs per slot may affect PDCCH monitoring.

A second type of PDCCH monitoring capability may be a per span PDCCH monitoring type. For example, the time unit may be a span based time unit having a separation between spans. The separation between spans may be less than a slot. If the time unit is per span, the maximum number of PDCCH candidates corresponds to a maximum number of PDCCH candidates and CCEs that the UE can monitor per span on the active DL BWP of a serving cell. Thus, the number of PDCCH candidates and CCEs per span, as well as the separation between spans, may affect PDCCH monitoring. In some examples, a span may comprise 2 or 3 symbols.

Wireless communication in different frequency bands may have different SCSs. For example, a larger subcarrier spacing may be used for higher frequency bands. As an example, an SCS of 120 kHz may be used in a lower frequency band, e.g., a 30 GHz carrier frequency, and an SCS of 480 kHz or 960 kHz may be used for a 60 GHz carrier frequency. The larger SCS may provide more robust communication and reduced a phase noise impact for the higher frequency bands. However, a slot length having an inverse relationship to an SCS will be reduced by a same factor that the SCS is increased. The UE's capability to monitor PDCCH candidates may be affected by the SCS and the corresponding change in slot length.

Table 1 illustrates an example correspondence between a maximum number of monitored PDCCH candidates per slot and per serving cell for different SCS ($\mu$), e.g., for the first type (e.g., per slot) PDCCH monitoring capability.

TABLE 1

| $\mu$ | maximum number of monitored PDCCH candidates per slot and per serving cell |
|---|---|
| 0 | 44 |
| 1 | 36 |
| 2 | 22 |
| 3 | 20 |

Figure 4B:
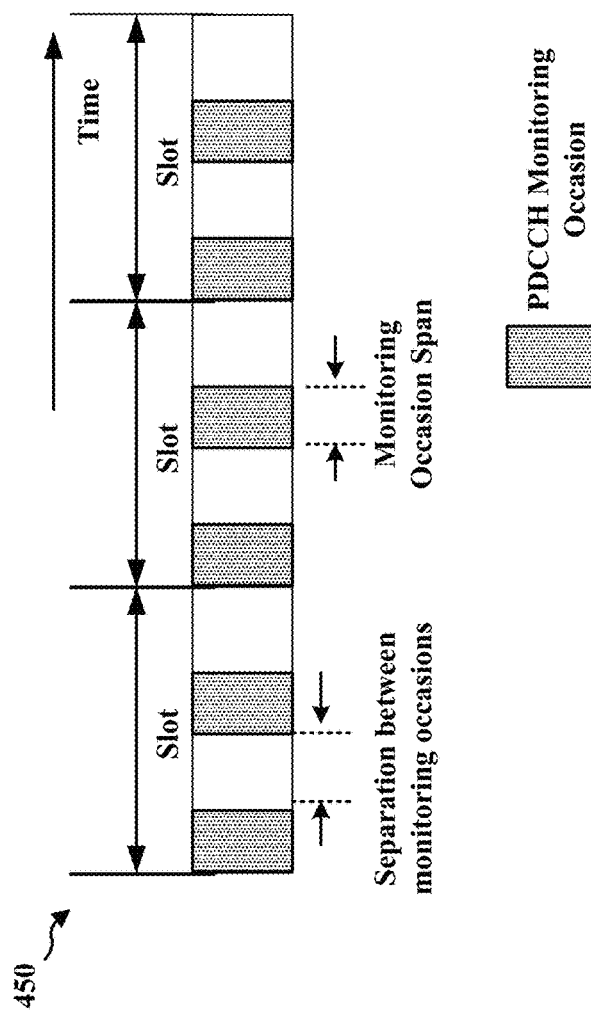
FIG. 4B illustrates example aspects of PDCCH monitoring occasions within slots.
Figure 4A:
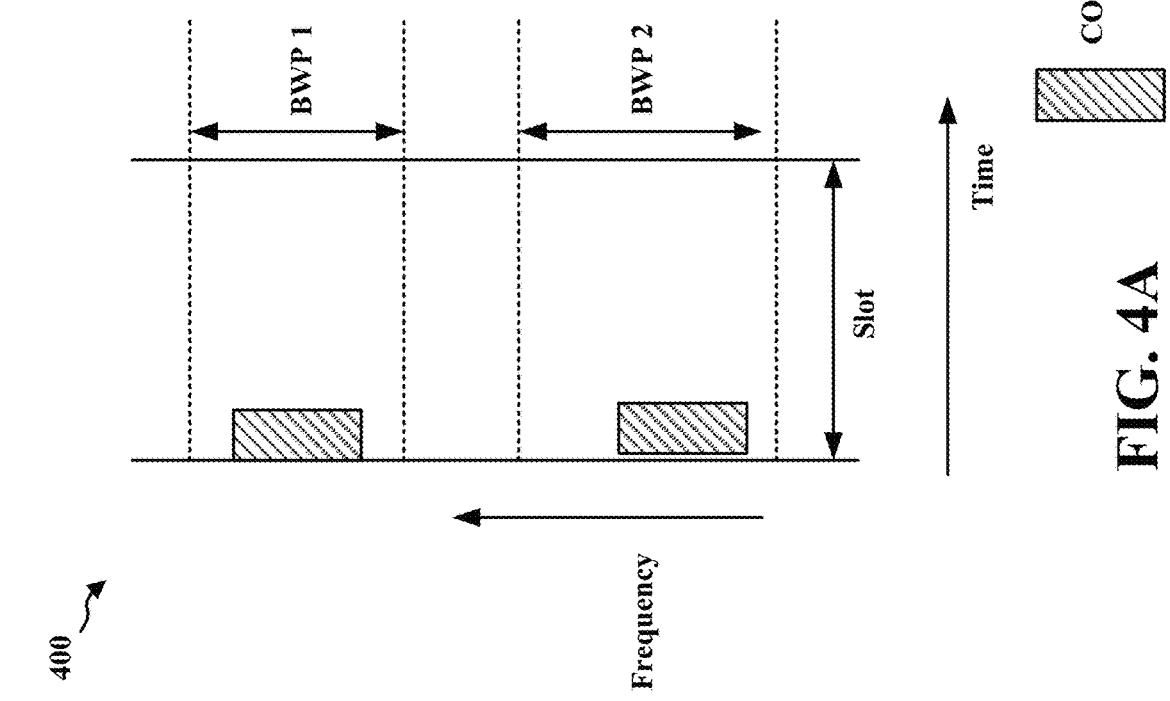
FIG. 4A illustrates example aspects of control resource sets (CORESETs) associated with bandwidth parts (BWPs).

FIG. 4B illustrates an example time diagram 450 showing two PDCCH monitoring occasions per slot. If two PDCCH monitoring occasions are configured per slot and each monitoring occasion is configured with 18 PDCCH candidates, for each slot, the UE may monitor a total of 36 PDCCH candidates for SCS=30 kHz ($\mu$=1), according to Table 1. For example, the UE may monitor for (or attempt to decode) 18 PDCCH candidates in the first monitoring occasion in the slot and 18 PDCCH candidates in the second monitoring occasion in the slot. In another example, if the two PDCCH monitoring occasions are provided in each slot and each monitoring occasion is configured with 20 PDCCH candidates, the UE may monitor 20 candidates in the first monitoring occasion and may skip the second monitoring occasion, as the remaining budget of PDCCH candidates (i.e., 16) is not enough to accommodate the 20 PDCCH candidates in the second monitoring occasion.

Table 2 illustrates an example correspondence between a maximum number of monitored PDCCH candidates per span for a combination and per serving cell for different SCS ($\mu$). Table 2 corresponds to the second type (e.g., per span) PDCCH monitoring capability. In Table 2, the combination refers to a combination (X,Y) of a minimum separation between monitoring occasions (X) and a length of a span (Y). For example, the combination (7,3) refers to a minimum separation of X=7 symbols between monitoring occasions and a Y=3 symbol length of a span. A span (e.g., a time duration) of a monitoring occasion and a separation (e.g., a time duration) between spans is illustrated for the example monitoring occasions in FIG. 4B.

TABLE 2

| | maximum number of monitored PDCCH candidates per span for combination and per serving cell | | |
|---|---|---|---|
| $\mu$ | (2, 2) | (4, 3) | (7, 3) |
| 0 | 14 | 28 | 44 |
| 1 | 12 | 24 | 36 |

If two PDCCH monitoring occasions are configured per slot and each monitoring occasion is configured with 18 PDCCH candidates, for each slot, the UE may monitor a total of 36 PDCCH candidates for SCS=30 kHz ($\mu$=1) and a combination of (7,3), according to Table 2. For example, the UE may monitor for (or attempt to decode) 18 PDCCH candidates in the first monitoring occasion and 18 PDCCH candidates in the second monitoring occasion, similar to the per slot example described in connection with Table 1. In another example, if the two PDCCH monitoring occasions are provided in each slot and each monitoring occasion is configured with 20 PDCCH candidates, for SCS=1 and a combination of (7,3), the UE may monitor 20 PDCCH candidates in the first monitoring occasion and 20 PDCCH candidates in the second monitoring occasion for a total of 40 PDCCH candidates per slot.

With a same search space configuration, the UE may monitor different numbers of PDCCH candidates per slot based on the type of PDCCH monitoring capability is used (e.g., per slot or per span). The rules for counting the PDCCH candidates may be different for the different types of PDCCH monitoring. Although the PDCCH candidates monitoring in the first example is the same based on Table 1 or Table 2, in the second example, the UE monitors 18 PDCCH candidates in a slot based on table 1 and monitors 40 PDCCH candidates in a slot based on Table 2. The difference in PDCCH monitoring may have a stronger effect on UE service when the UE is configured for carrier aggregation, when a larger number of PDCCH candidates are configured, or when overbooking occurs. Overbooking may refer to how the total number of PDCCH candidates are distributed over monitoring occasions. In the first example, the number of total configured PDCCH candidates per slot is 40, which is larger than the UE capability of monitoring 36 PDCCH candidates. The UE is overbooked. However, the actual number of monitored PDCCH candidates is always less than or equal to the UE capability, e.g., the maximum number of PDCCH candidates to be monitored by the UE. Although this example is described for a single carrier, in a multi carrier configuration, the same operation (e.g., determining which PDCCH monitoring occasions to monitor and which PDCCH monitoring occasions to skip) may be performed across carriers, which may lead to a stronger effect for different types of PDCCH monitoring.

A UE may support more than one (X,Y) combination for a per span PDCCH monitoring capability. For example, the UE may support both (4,3) and (7,3) from Table 2. In such an example, the UE may use the supported combination having the largest blind decoding/CCE limit to determine the maximum number of monitored PDCCH candidates. If a UE indicates a capability to monitor PDCCH according to multiple (X, Y) combinations and a configuration of search space sets to the UE for PDCCH monitoring on a cell results to a separation of every two consecutive PDCCH monitoring spans that is equal to or larger than the value of X for one or more of the multiple combinations (X, Y), the UE may monitor PDCCH on the cell according to the combination (X, Y), from the one or more combinations (X, Y), that is associated with the largest maximum number of $M_{PDCCH}^{max,(X,Y),\mu}$ and $C_{PDCCH}^{max,(X,Y),\mu}$ e.g., defined in a table. $M_{PDCCH}^{max,(X,Y),\mu}$ may refer to maximum number of monitored PDCCH candidates per span for a UE in a DL BWP with SCS configuration µ for operation with a single serving cell, and $C_{PDCCH}^{max,(X,Y),\mu}$ may refer to the maximum number of non-overlapped CCEs for a DL BWP with SCS configuration µ that a UE is expected to monitor corresponding PDCCH candidates per span for operation with a single serving cell. The UE may expect to monitor PDCCH according to the same combination (X, Y) in every slot on the active DL BWP of a cell.

The reduced slot length associated with a higher SCS may present a challenge for PDCCH monitoring of PDCCH candidates whether the PDCCH monitoring type is a per slot PDCCH monitoring or a per span PDCCH monitoring. A decreased slot length reduces the amount of time for the UE to perform blind decoding for the number of PDCCH candidates. Span based PDCCH monitoring in which the UE may monitor the PDCCH candidates based on multiple spans within a single slot may present an added challenge with a reduced the slot length. For example, with a reduced slot length for a larger SCS, the per slot and per span PDCCH monitoring may have a lower number of PDCCH candidates and CCEs that the UE is expected to monitor. For example, the maximum number of PDCCH candidates and non-overlapped CCEs that the UE is expected to monitor per time unit may be reduced for a higher SCS. The reduced number of PDCCH candidates and CCEs monitored by the UE reduces scheduling flexibility and may impact system performance. The reduced length of the sub-slot separation between spans in per span PDCCH monitoring may similarly lead to reduction in PDCCH scheduling flexibility.

In some examples, the UE may apply slot based PDCCH monitoring for a bundle of multiple slots (i.e., a super-slot) rather than for a single slot. In some examples, the UE may perform a span based PDCCH monitoring having a separation between spans that is longer than a slot length. Thus, the "time unit" associated with the maximum number of PDCCH candidates that the UE is expected to monitor may be based on more than one slot and may provide the UE a longer period of time to monitor the number of PDCCH candidates.

The UE may receive a PDCCH configuration from the base station that indicates a type of PDCCH monitoring for the UE to apply. The PDCCH configuration may be associated with a particular BWP, and the UE may receive a PDCCH configuration per configured BWP. For example, in FIG. 4A, the UE may receive a configuration for BWP 1 that includes a corresponding PDCCH configuration (e.g., which may be referred to as a "PDCCH-Config") indicating a monitoring capability configuration. The monitoring capability configuration (e.g., which may be referred to as a "monitoringCapabilityConfig") that configures a first type of PDCCH monitoring capability (e.g., a per slot PDCCH monitoring capability or PDCCH monitoring capability based on a first release) or a second type of PDCCH monitoring capability (e.g., a per span PDCCH monitoring capability or PDCCH monitoring capability based on a second release) on a serving cell. The monitoring capability configuration enables one of multiple types of PDCCH monitoring capability (e.g., a type of PDCCH monitoring supported by the UE). Prior to receiving the configuration, the UE may indicate to the base station support for one or more types of PDCCH monitoring. Among other parameters, the PDCCH configuration may further include configurations for one or more CORESETs, one or more search spaces, a downlink preemption, a transmission power control (TPC) parameter for PUSCH/PUCCH/SRS, an uplink cancellation parameter, a search space switch configuration.

The UE may be configured with different PDCCH configurations (e.g., including different monitoring capability configurations) for different BWPs. For example, the UE may receive a configuration for BWP1 in FIG. 4A including a first PDCCH configuration, which may indicate a first type of PDCCH monitoring (e.g., a per slot type of PDCCH monitoring capability). The UE may receive a configuration for the BWP2 in FIG. 4A including a second PDCCH configuration, which may indicate a second type of PDCCH monitoring (e.g., a per span type of PDCCH monitoring capability). If the UE switches BWPs, the UE may correspondingly change the PDCCH monitoring. For example, if the UE receives an indication to switch from BWP1 to BWP2, the UE may change from performing per slot based PDCCH monitoring in BWP1 to performing per span based PDCCH monitoring in BWP2. The different types of PDCCH monitoring may also be referred to as different modes of PDCCH monitoring.

A BWP switch may include a delay of approximately 2 ms. The BWP switch delay may span a large number of symbols (e.g., more than 50 or more than 100 symbols) at larger SCS sizes due to the reduced slot length. The BWP switch may lead to an interruption of scheduling for the UE.

Aspects presented herein enable the UE to apply a PDCCH monitoring configuration associated with a search space set group and to switch between PDCCH monitoring configurations (e.g., based on different PDCCH monitoring capabilities) in association with a search space set group switch. A search space set group switch may be faster than a BWP switch and may enable the UE to change PDCCH monitoring without the interruption in service that may be caused by a BWP switch at larger SCS of a higher frequency range. In some aspects, the search space set group switching may be applied for 60 GHz wireless communication in an unlicensed frequency spectrum. The search space set group switching may be performed within a BWP based on baseband operations, e.g., in contrast to BWP switching. Thus, the switch between search space set groups can be performed more quickly by the UE and may reduce/avoid interruption of service in comparison to BWP switching.

Aspects presented herein enable the UE to employ a PDCCH monitoring capability (or PDCCH monitoring type/mode) switching mechanism that is based on a search space set group switch in order to reduce interruption of service and to enable the UE to switch between different modes of PDCCH monitoring more quickly. The aspects may help the UE to switch modes of PDCCH monitoring in a way that reduces or avoids service interruption even with the smaller slot lengths associated with a larger SCS. The aspects presented herein may be applied for 60 GHz wireless communication, such as 60 GHz wireless communication in an unlicensed frequency spectrum.

Figure 5:
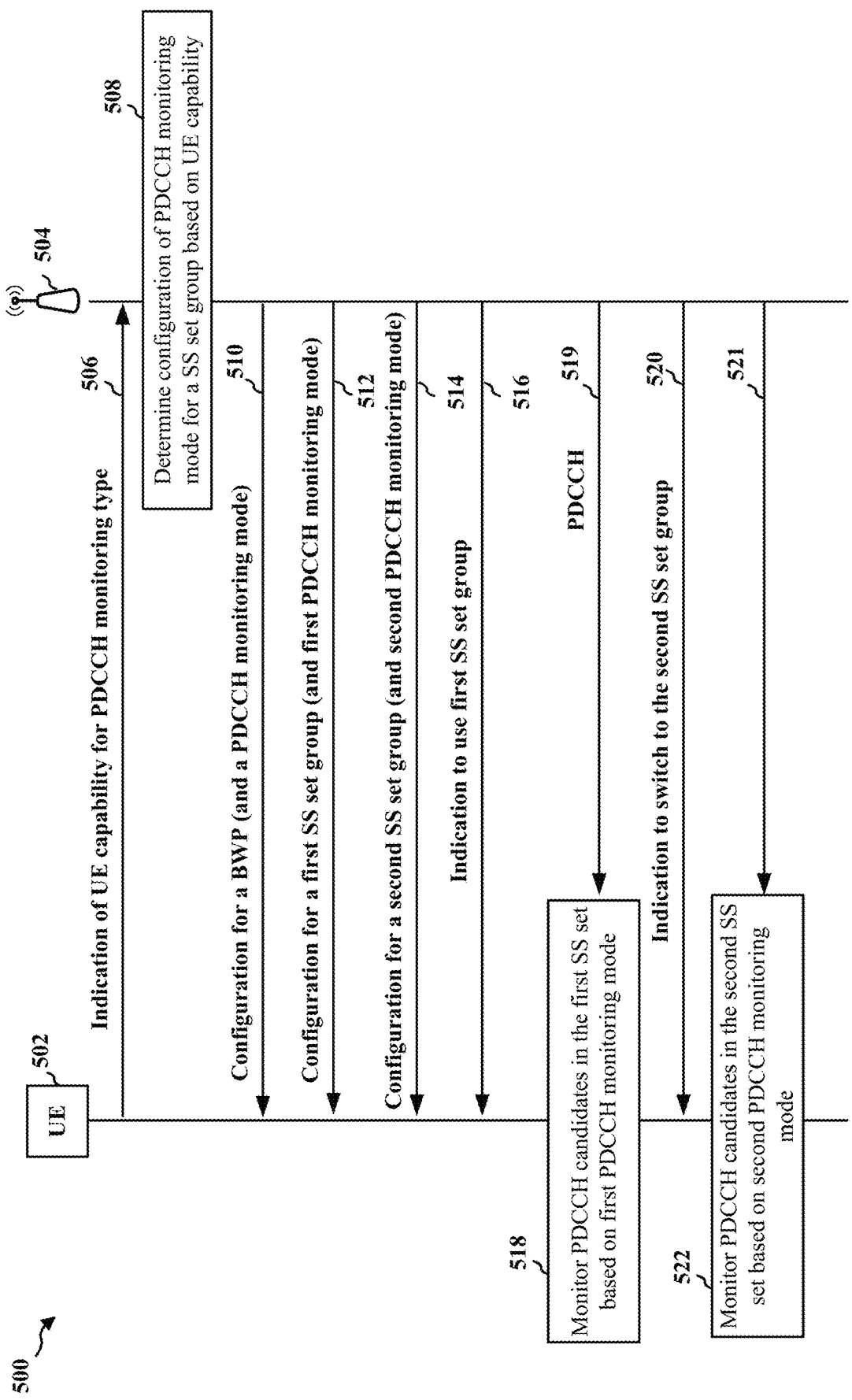
FIG. 5 illustrates an example communication flow between a UE and a base station including a configuration of one or more search space set groups having an associated, configured PDCCH monitoring mode.

FIG. 5 illustrates an example communication flow 500 between a UE 502 and a base station 504 including a configuration of a PDCCH monitoring capability (e.g., which may be referred to as a PDCCH monitoring mode or a PDCCH monitoring type) associated with a search space set group, as presented herein.

The UE 502 may receive an indication of a PDCCH monitoring capability (e.g., PDCCH monitoring mode or PDCCH monitoring type) per search space (SS) set group configuration from the base station 504. In some aspects, the UE 502 and the base station 504 may communicate using a larger SCS for a higher frequency carrier, such as for a 60 GHz frequency carrier in an unlicensed spectrum. FIG. 5 illustrates the UE receiving a configuration 512 for a first SS set group. In some aspects, the configuration 512 may be referred to as a search space switch configuration or a "SearchSpaceSwitchConfig"). The configuration 512 includes a PDCCH monitoring parameter that indicates a type/mode of PDCCH monitoring. In some examples, the PDCCH monitoring parameter may be referred to as a PDCCH monitoring capability configuration (e.g., which may be referred to as a "monitoringCapabilityConfig"). The PDCCH monitoring capability configuration may configure the UE 502 to apply a particular PDCCH monitoring capability supported by the UE when monitoring PDCCH candidates of the first SS set group. The PDCCH monitoring capability configuration for the first SS set group configuration may indicate a per slot PDCCH monitoring mode or a per span PDCCH monitoring mode. The per slot PDCCH monitoring mode may be for one or more slots, e.g., PDCCH monitoring based on a single slot or based on multiple slots. The per span PDCCH monitoring mode may include spans having a separation in time of less than a slot length or having a separation in time of more than a slot length. The configuration 512 may further indicate a cell group for the SS switch and/or a search space switch delay.

The PDCCH monitoring mode configured for the SS set group may be based on a PDCCH monitoring capability supported by the UE. In some aspects, the UE 502 may transmit an indication 506, to the base station 504, of a UE capability supported by the UE for one or more PDCCH monitoring modes (e.g., for one or more PDCCH monitoring capabilities). At 508, the base station 504 may determine a PDCCH monitoring mode configuration (e.g., for any of the configurations 510, 512, or 514) based on the UE capability supported by the UE 502 (e.g., as indicated at 506).

As illustrated at 518, the UE 502 may monitor PDCCH candidates in the first SS set group based on the first PDCCH monitoring mode indicated in the configuration 512. In addition to the configuration 512, the UE 502 may receive a further indication 516 from the base station 504 to use the SS set group, e.g., enabling or activating the configured first SS set group for the UE 502.

The UE may further receive a configuration 514 for a second, different SS set group. In some aspects, the configuration 514 may be referred to as a search space switch configuration or a "SearchSpaceSwitchConfig"), similar to the configuration 512. The configuration 514 includes a configuration of a PDCCH monitoring mode associated with the SS set group, similar to the configuration 512. The PDCCH monitoring capability configuration may configure the UE 502 to apply a particular PDCCH monitoring capability supported by the UE when monitoring PDCCH candidates of the second SS set group. The PDCCH monitoring mode configuration for the second SS set group configuration may indicate a per slot PDCCH monitoring mode or a per span PDCCH monitoring mode and may be different than the PDCCH monitoring mode configured for the first SS set group, at 512. The configuration 514 may further indicate a cell group for the SS switch and/or a search space switch delay.

Although configurations 512 and 514 are illustrated with separate lines, the configurations may be provided to the UE in a single message or in separate messages. For example, the UE 502 may receive the configurations 510, 512, and/or 514 in a single RRC message or in separate RRC messages.

As illustrated at 520, the UE 502 may receive, from the base station 504, an indication 520 to perform a SS set group switch from the first SS set group to the second SS set group. In response to the indication, the UE may perform the SS switch and may transition to monitoring PDCCH candidates, at 522, in the second SS set group based on the second PDCCH monitoring mode received in the configuration 514 (which may be different than the first PDCCH monitoring mode received in the configuration 512). The UE 502 may change PDCCH monitoring modes based on a SS set group switch.

Thus, when the UE 502 is monitoring PDCCH candidates in a particular SS set group, the UE may apply the PDCCH monitoring capability (e.g., mode or type) configured for the particular SS set group. If the SS set group is associated with a per slot PDCCH monitoring capability, the UE performs PDCCH monitoring on the monitoring occasions determined by the search space sets in the group using a per slot limit of the number of PDCCH candidates and non-overlapped CCEs to monitor (e.g., the maximum number of monitored PDCCH candidates and non-overlapped CCEs for the search space set group and serving cell). If the search space set group is associated with a per span PDCCH monitoring capability, the UE applies a per span limit of the number of PDCCH candidates and non-overlapping CCEs to monitor in the search space group, as well as the minimum separation between spans.

The base station 504 may transmit the PDCCH 519 in a first search space, for which the base station configured a first PDCCH monitoring mode, based, at least in part, on the first PDCCH monitoring mode that the UE 502 will apply to monitor for the PDCCH. The base station 504 may transmit a PDCCH 521, in a second search space for which the base station configured a second PDCCH monitoring mode, based, at least in part, on the second PDCCH monitoring mode that the UE 502 will apply to monitor for the PDCCH.

Although FIG. 5 illustrates an example in which the UE receives a configuration for two SS set groups, the concept may be similarly applied to more than two SS set groups, and the UE 502 may receive a configuration for more than two SS set groups, each SS set group having a configured PDCCH monitoring mode/type associated with the SS set group.

The configurations 512 and 514 may be comprised in a PDCCH configuration, which may be further comprised in a configuration for a particular BWP. In some aspects, the UE 502 may further receive the configuration 510 for the BWP that indicates a PDCCH monitoring mode (e.g., either per slot PDCCH monitoring capability or per span PDCCH monitoring capability) configured for the BWP. The UE may receive a configuration for multiple BWPs with each BWP configuration indicating a corresponding PDCCH monitoring capability configuration (e.g., a type/mode for PDCCH monitoring in the BWP). In some BWPs, the UE may receive a PDCCH monitoring mode/type configuration (e.g., PDCCH monitoring capability configuration) for individual SS set groups. In other BWPs, the UE may not receive a PDCCH monitoring type/mode configuration for individual SS set groups. If the UE 502 receives a first PDCCH monitoring mode/type configuration for a BWP and a second, different PDCCH monitoring mode/type for a SS set group within the BWP, the UE may prioritize the second PDCCH monitoring mode/type configuration for the SS set group over the mode/type configured for the BWP. For example, if the PDCCH monitoring mode received in the BWP configuration 510 is different than the first PDCCH monitoring mode received in the configuration 512 for the first SS set group, the UE may monitor PDCCH candidates, at 518, in the first SS set group based on the first PDCCH monitoring mode and not on the PDCCH monitoring mode configured for the BWP in configuration 510.

Figures 6A, 6B:
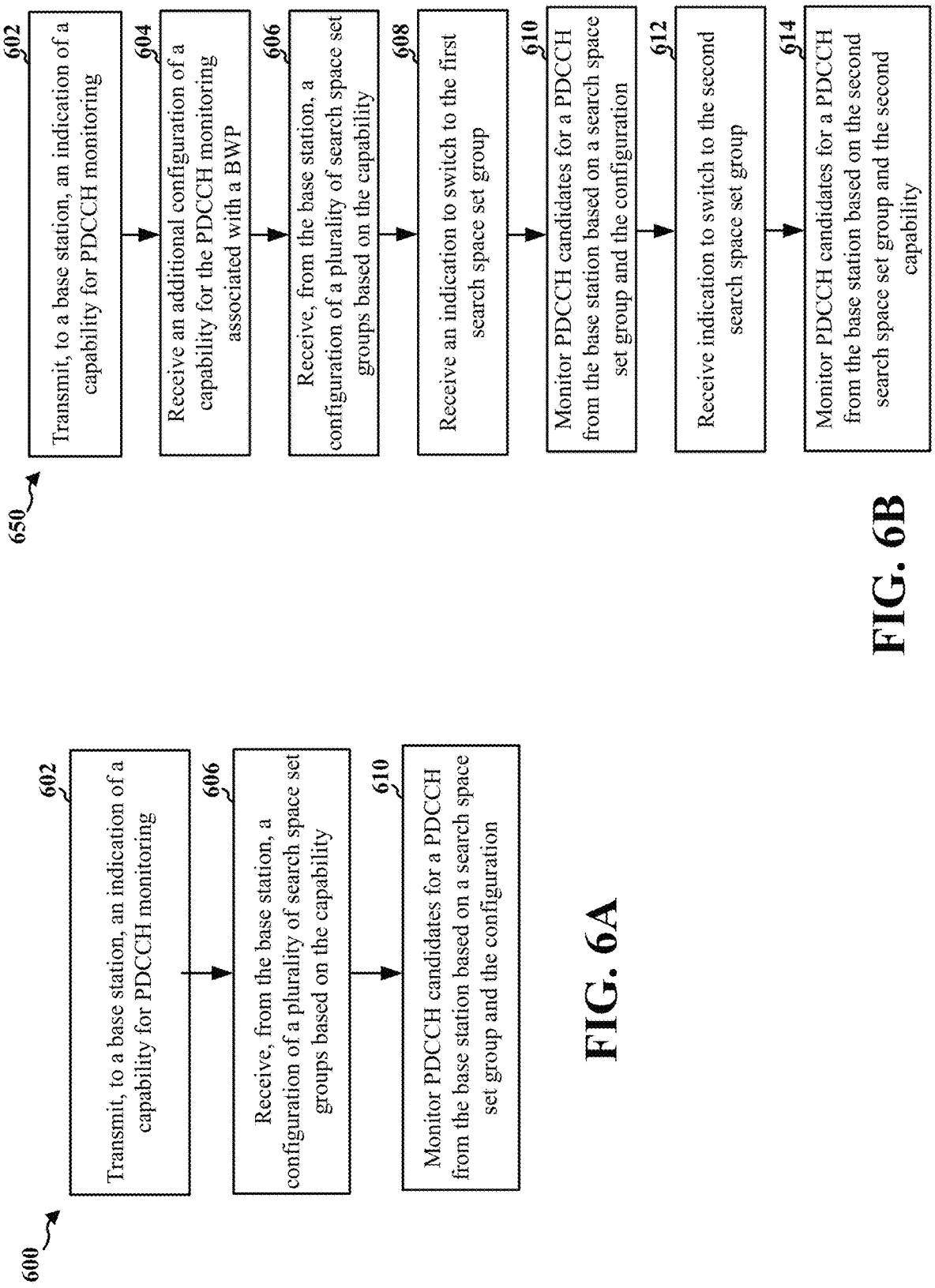
FIGS. 6A and 6B are flowcharts of methods of wireless communication at a UE including the reception of a configuration of one or more search space set groups having a configured PDCCH monitoring mode.

FIG. 6A is a flowchart 600 of a method of wireless communication. The method may be performed by a UE (e.g., the UE 104; 350, 502; the apparatus 702). The method enables the UE to apply a PDCCH monitoring mode based on a SS set group and to switch PDCCH monitoring modes in association with a switch between SS set groups. The method may help to reduce service interruption in PDCCH monitoring for the UE and may improve scheduling flexibility. In some aspects, the wireless communication may be based on an increased SCS and/or a higher frequency carrier. In some aspects, the wireless communication may be based on a 60 GHz frequency carrier.

At 602, the UE transmits, to a base station, an indication of a capability for PDCCH monitoring. The capability may indicate that the UE supports a particular PDCCH monitoring mode or type. The capability may include a PDCCH monitoring capability for one or more slots (e.g., which may be referred to as a per slot PDCCH monitoring capability or a per multi-slot PDCCH monitoring capability). The capability may include a span based PDCCH monitoring capability. In some aspects, the UE may support PDCCH monitoring based on a separation between spans that is longer than a slot. In some aspects, the UE may support PDCCH monitoring based on a separation between spans that is less than a slot. The UE may indicate the capability in a UE capability report, e.g., in RRC signaling. FIG. 5 illustrates an example of the UE 502 providing UE capability information (e.g., indication 506) to the base station indicating that the UE supports one or more PDCCH monitoring modes (e.g., a per slot PDCCH monitoring capability and/or a per span PDCCH monitoring capability). The transmission of the indication of the capability may be performed by the UE capability component 740 via the transmission component 734 and/or cellular RF transceiver 722 of the apparatus 702 in FIG. 7.

At 606, the UE receives, from the base station, a configuration of a plurality of search space set groups based on the capability. The reception of the configuration may be performed by the SS set group configuration component 742 via the reception component 730 and/or cellular RF transceiver 722 of the apparatus 702 in FIG. 7. The configuration may include any of the aspects described in connection with the configuration 512 or 514 in FIG. 5. The UE may receive the configuration for the PDCCH monitoring in a search space switch configuration. The configuration may include a monitoring capability configuration parameter. The UE may receive the configuration in RRC signaling from the base station.

The UE may transmit, or otherwise indicate, multiple capabilities for PDCCH monitoring, at 602. The UE may receive a configuration for different capabilities (e.g., different PDCCH monitoring modes) associated with a different search space set group. For example, the UE may receive a configuration of a first search space set group associated with a first capability for the PDCCH monitoring and receives a configuration of a second search space set group associated with a second capability for the PDCCH monitoring. FIG. 5 illustrates an example of a UE 502 receiving a configuration 512 for a first SS set group and a configuration 514 for a second SS set group, each having an associated PDCCH monitoring mode configured for the UE.

At 610, the UE monitors PDCCH candidates for a PDCCH from the base station based on a search space set group and the configuration. As described in connection with 518 or 522, the UE may apply a PDCCH monitoring mode associated with the search space set group in which the UE monitors the PDCCH candidates. The monitoring may be performed, e.g., by the PDCCH candidate component 746, the reception component 730 and/or the cellular RF transceiver 722 of the apparatus 702 in FIG. 7.

FIG. 6B illustrates a flowchart 650 of a method of wireless communication. The method may be performed by a UE (e.g., the UE 104; 350, 502; the apparatus 702). The method in FIG. 6B may include 602, 606, and 610, e.g., including any of the aspects described in connection with FIG. 6A. In some aspects, the UE may receive an indication, at 608, to switch to the first search space set group, wherein the UE monitors for the PDCCH, at 610, based on the first capability associated with the first search space set group. The reception of the indication, and the performance of the SS set group switch, may be performed by the SS switch component 748 via the reception component 730 of the apparatus 702 in FIG. 7.

As illustrated at 612, the UE may further receive an indication to switch to the second search space set group. The reception of the indication, and the performance of the SS set group switch, may be performed by the SS switch component 748 via the reception component 730 of the apparatus 702 in FIG. 7. FIG. 5 illustrates an example of a UE 502 receiving an indication 520 to switch between a first search space set group having a first PDCCH monitoring mode and a second search space set group having a second PDCCH monitoring mode.

As illustrated at 614, the UE may monitor for the PDCCH based on the second capability in response to switching to the second search space set group. The monitoring may be performed, e.g., by the PDCCH candidate component 746, the reception component 730 and/or the cellular RF transceiver 722 of the apparatus 702 in FIG. 7. The first and second capabilities (e.g., first and second PDCCH monitoring modes) may be different, and the UE may switch between different PDCCH monitoring modes based on a SS set group switch.

As illustrated at 604, the UE may further receive an additional configuration of a capability for the PDCCH monitoring associated with a BWP. If the PDCCH monitoring configuration for the BWP is different than for the search space set group, the UE may prioritize the PDCCH monitoring mode configured for the search space set group over that configured for the BWP, as described in connection with FIG. 5. The UE may monitor for PDCCH candidates using the configuration associated with the search space set group and not the additional capability associated with the BWP. The additional capability may include a single slot based PDCCH monitoring capability or a span based PDCCH monitoring capability having a separation between spans that is less than a slot.

Figure 7:
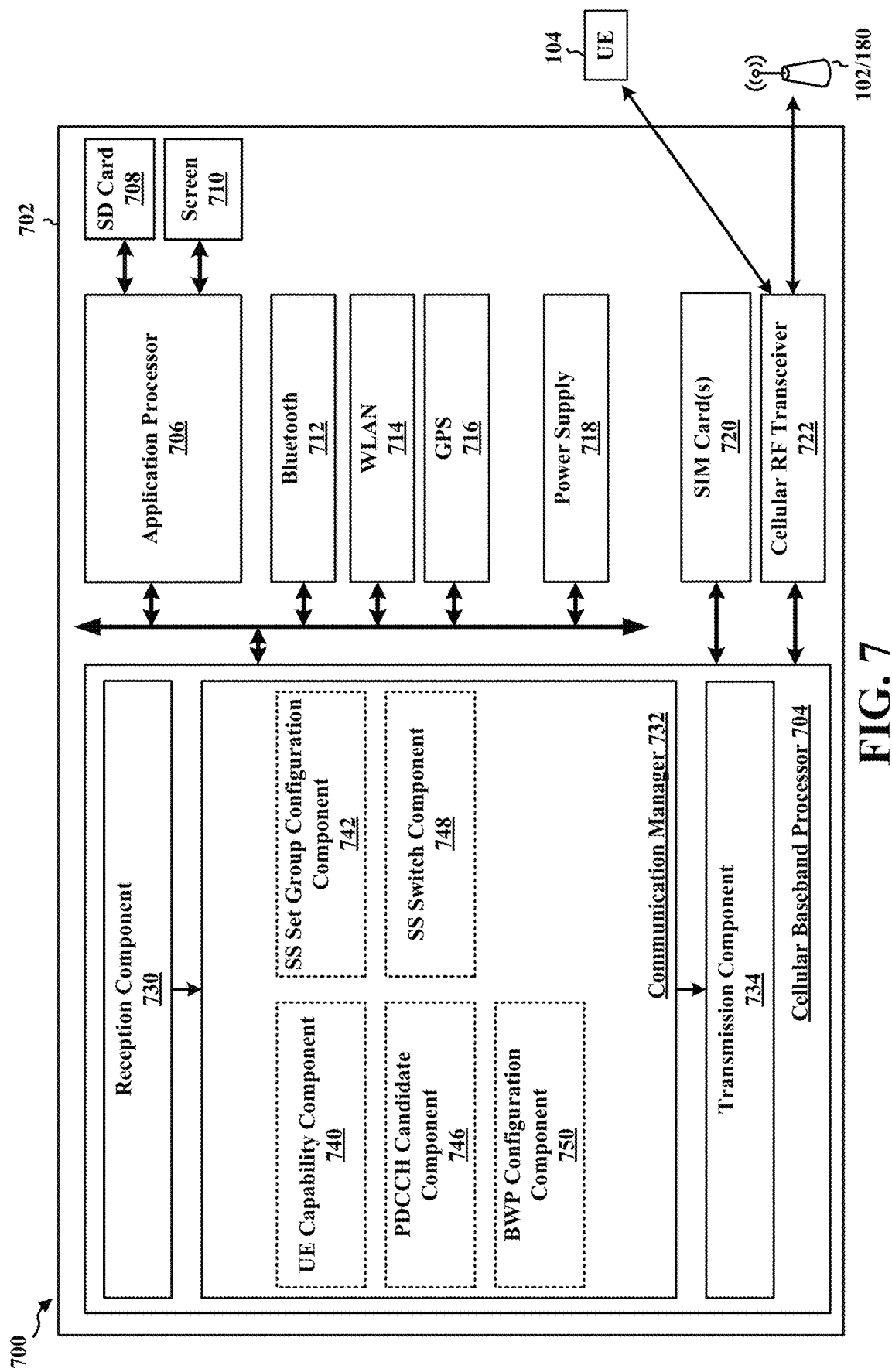
FIG. 7 is a diagram illustrating an example of a hardware implementation for an example apparatus.

FIG. 7 is a diagram 700 illustrating an example of a hardware implementation for an apparatus 702. The apparatus 702 may be a UE, a component of a UE, or may implement UE functionality. In some aspects, the apparatus 702 may include a cellular baseband processor 704 (also referred to as a modem) coupled to a cellular RF transceiver 722. In some aspects, the apparatus 702 may further include one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the cellular baseband processor 704, and in another configuration, the apparatus 702 may be the entire UE (e.g., see 350 of FIG. 3) and include the additional modules of the apparatus 702.

The communication manager 732 includes a UE capability component 740 that is configured to transmit, to a base station, an indication of a capability for PDCCH monitoring, e.g., as described in connection with 602 FIG. 6A or 6B. The communication manager 732 further includes an SS set group configuration component 742 that is configured to receive, from the base station, a configuration of a plurality of search space set groups based on the capability, e.g., as described in connection with 606 FIG. 6A or 6B. The communication manager 732 further includes a PDCCH candidate component 746 that is configured to monitor PDCCH candidates for a PDCCH from the base station based on a search space set group and the configuration, e.g., as described in connection with 610 and/or 614 of FIG. 6A or 6B. The communication manager 732 further includes an SS switch component 748 that is configured to receive an indication to switch to the first or second search space set group and/or to apply a SS set group switch, e.g., as described in connection with 608 and/or 612 in FIG. 6B. The communication manager 732 further includes a BWP configuration component 750 that is configured to receive an additional configuration of a capability for the PDCCH monitoring associated with a BWP, e.g., as described in connection with 604 FIG. 6B.

The apparatus may include additional components that perform each of the blocks of the algorithm in the flowcharts of FIGS. 6A, 6B, and/or any of the aspects performed by the UE 502 in the communication flow 500 in FIG. 5. As such, each block in the flowchart of FIGS. 6A, 6B, and/or any of the aspects performed by the UE 502 in the communication flow 500 in FIG. 5, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 702 may include a variety of components configured for various functions. In one configuration, the apparatus 702, and in particular the cellular baseband processor 704, includes means for transmitting, to a base station, a capability for PDCCH monitoring; means for receiving, from the base station, a configuration of a plurality of search space set groups based on the capability; and means for monitoring PDCCH candidates for a PDCCH from the base station based on a search space set group and the configuration. The apparatus 702 may further includes means for receiving an indication to switch to the first search space set group, where the UE monitors for the PDCCH based on the first capability associated with the first search space set group. The apparatus 702 may further include means for receiving an indication to switch to the second search space set group; and means for monitoring for the PDCCH based on the second capability in response to switching to the second search space set group. The apparatus 702 may further include means for receiving an additional configuration of a capability for the PDCCH monitoring associated with a BWP, where the additional capability includes a single slot based PDCCH monitoring capability or a span based PDCCH monitoring capability having a separation between spans that is less than a slot. The means may be one or more of the components of the apparatus 702 configured to perform the functions recited by the means. As described supra, the apparatus 702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 8B:
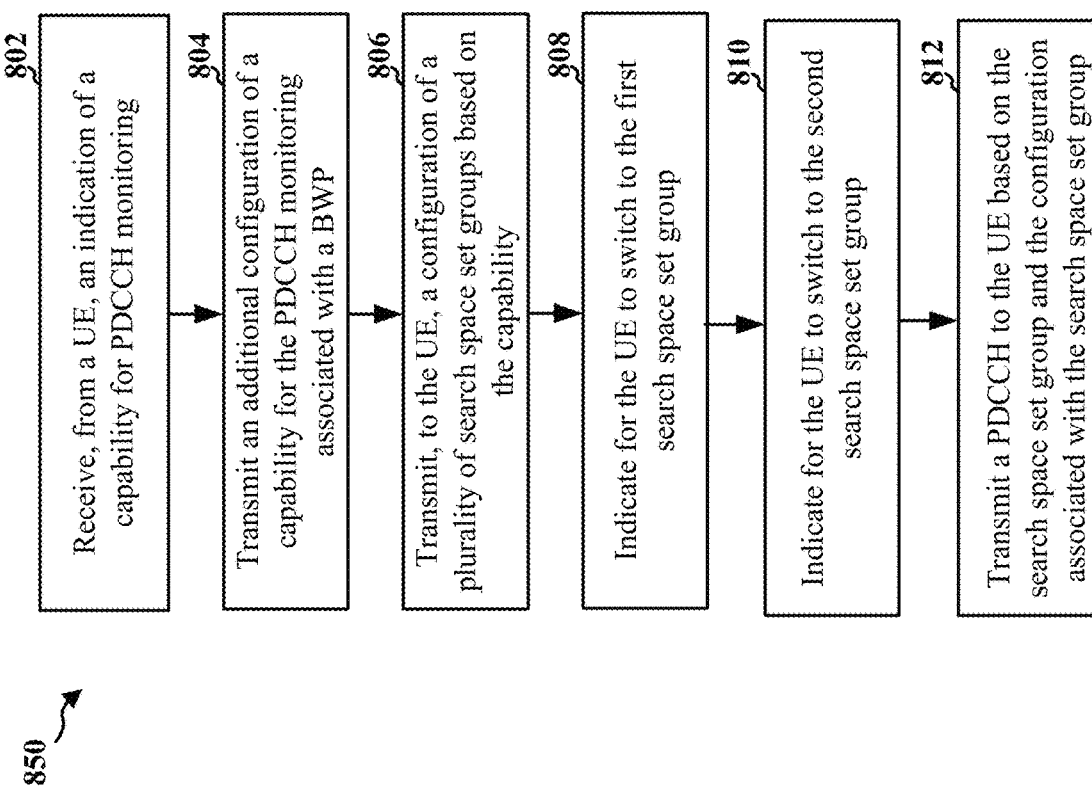
FIGS. 8A and 8B are flowcharts of methods of wireless communication at a base station including the configuration, for a UE, of one or more search space set groups having a configured PDCCH monitoring mode.
Figure 8A:
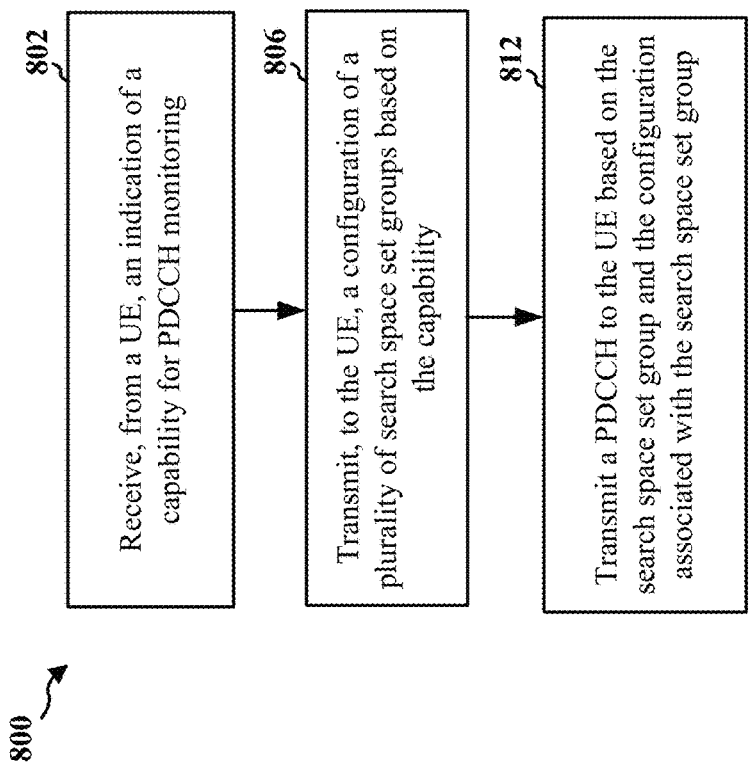

FIG. 8A is a flowchart 800 of a method of wireless communication. The method may be performed by a base station (e.g., the base station 102, 180, 310, 504; the apparatus 902. The method enables the base station to configure a PDCCH monitoring mode for a UE based on a SS set group and to indicate for the UE to switch PDCCH monitoring modes in association with a switch between SS set groups. The method may help to reduce service interruption with the UE and may improve scheduling flexibility at the base station. In some aspects, the wireless communication may be based on an increased SCS and/or a higher frequency carrier. In some aspects, the wireless communication may be based on a 60 GHz frequency carrier.

At 802, the base station receives, from a UE, receiving, an indication of a capability for PDCCH monitoring. The capability may indicate that the UE supports a particular PDCCH monitoring mode or type. The capability may include a PDCCH monitoring capability for one or more slots (e.g., which may be referred to as a per slot PDCCH monitoring capability or a per multi-slot PDCCH monitoring capability). The capability may include a span based PDCCH monitoring capability. In some aspects, the UE may support PDCCH monitoring based on a separation between spans that is longer than a slot. In some aspects, the UE may support PDCCH monitoring based on a separation between spans that is less than a slot. The base station may receive the capability in a UE capability report, e.g., in RRC signaling. FIG. 5 illustrates an example of the base station 504 receiving UE capability information (e.g., in indication 506) from the UE 502 indicating that the UE supports one or more PDCCH monitoring modes (e.g., a per slot PDCCH monitoring capability and/or a per span PDCCH monitoring capability). The reception of the indication of the capability may be performed by the UE capability component 940 via the reception component 930 and/or cellular RF transceiver 922 of the apparatus 902 in FIG. 9.

At 806, the base station transmits, to the UE, a configuration of a plurality of search space set groups based on the capability. The transmission of the configuration may be performed by the SS set group configuration component 942 via the transmission component 934 and/or cellular RF transceiver 922 of the apparatus 902 in FIG. 9. The configuration may include any of the aspects described in connection with the configuration 512 or 514 in FIG. 5. The base station may transmit the configuration for the PDCCH monitoring in a search space switch configuration. The configuration may include a monitoring capability configuration parameter. The transmit the configuration in RRC signaling to the UE. The base station may configure multiple search space set groups for the UE, each search space set group being associated with a different PDCCH monitoring capability. For example, the base station may configure, for the UE, a first search space set group associated with a first capability for the PDCCH monitoring associated and configure, for the UE, a second search space set group associated with a second capability for the PDCCH monitoring.

At 812, the base station transmits a PDCCH to the UE based on the search space set group and the configuration associated with the search space set group. For example, if the base station transmits the PDCCH in a first search space for which the base station configured a first PDCCH monitoring mode, the base station may transmit the PDCCH to the UE based, at least in part, on the first PDCCH monitoring mode that the UE will apply to monitor for the PDCCH. If the base station transmits the PDCCH in a second search space for which the base station configured a second PDCCH monitoring mode, the base station may transmit the PDCCH to the UE based, at least in part, on the second PDCCH monitoring mode that the UE will apply to monitor for the PDCCH. The transmission of the PDCCH may be performed by the PDCCH component 946 via the transmission component 934 of the apparatus 902.

FIG. 8B illustrates a flowchart 850 of a method of wireless communication. The method may be performed by a base station (e.g., the base station 102, 180, 310, 504; the apparatus 902. The method in FIG. 8B may include 802, 806, and 812, e.g., including any of the aspects described in connection with FIG. 8A. As illustrated at 808, in some aspects, the base station may further indicate for the UE to monitor the first search space set group and to use the first capability for the PDCCH monitoring associated with the first search space set group. The indication may be performed by the SS switch component 948 via the transmission component 934 of the apparatus 902 in FIG. 9. FIG. 5 illustrates an example of a base station 504 transmitting an indication 516 to use a first search space set group having a first PDCCH monitoring mode.

As illustrated at 810, the base station may further indicate for the UE to switch to the second search space set group and to use the second capability for the PDCCH monitoring associated with the second search space set group. The indication may be performed by the SS switch component 948 via the transmission component 934 of the apparatus 902 in FIG. 9. FIG. 5 illustrates an example of a base station 504 transmitting an indication 520 to switch between a first search space set group having a first PDCCH monitoring mode and a second search space set group having a second PDCCH monitoring mode.

As illustrated at 804, the base station may further transmit, to the UE, an additional configuration of a capability for the PDCCH monitoring associated with a BWP. The PDCCH monitoring configuration for the BWP may be different than for the search space set group. The additional capability may include a single slot based PDCCH monitoring capability or a span based PDCCH monitoring capability having a separation between spans that is less than a slot. The transmission of the additional configuration may be performed, e.g., by the BWP configuration component 950 via the transmission component 934 of the apparatus 902.

In some aspects, the base station may configure the UE for the PDCCH monitoring associated with the search space set group and not the additional capability associated with the BW.

Figure 9:
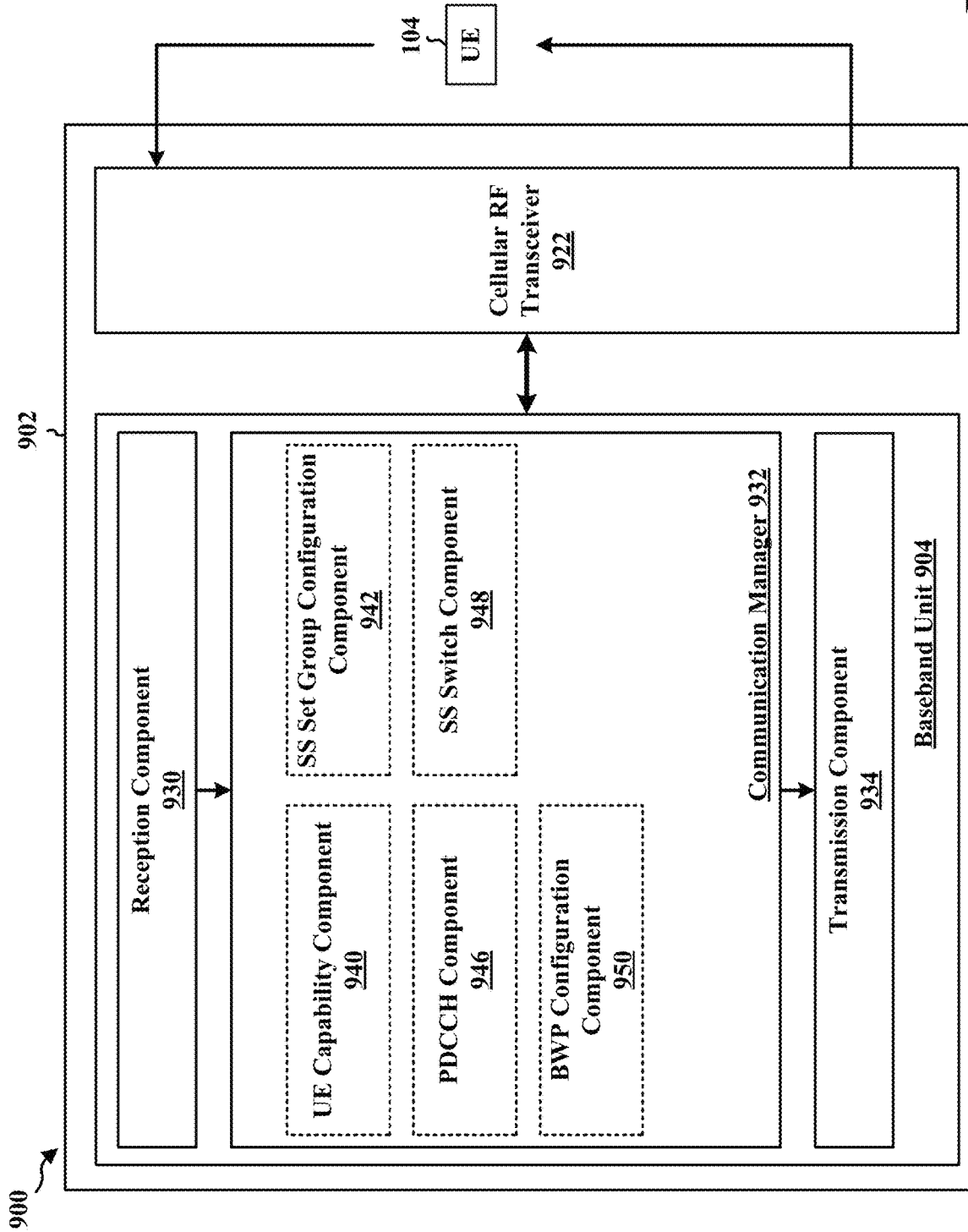
FIG. 9 is a diagram illustrating an example of a hardware implementation for an example apparatus.

FIG. 9 is a diagram 900 illustrating an example of a hardware implementation for an apparatus 902. The apparatus 902 is a base station, a component of a base station, or implements base station functionality. In some aspects, the apparatus 902 includes a baseband unit 904. The baseband unit 904 may communicate through a cellular RF transceiver 922 and at least one antenna with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 includes a UE capability component 940 that is configured to receive, from a UE, an indication of a capability for PDCCH monitoring, e.g., as described in connection with 802 FIG. 8A or 8B. The communication manager 932 further includes an SS set group configuration component 942 that is configured to transmit, to a UE, a configuration of a plurality of search space set groups based on the capability, e.g., as described in connection with 806 FIG. 8A or 8B. The communication manager 932 further includes a PDCCH component 946 configured to transmit a PDCCH to the UE based on the search space set group and the configuration associated with the search space set group, e.g., as described in connection with 812 in FIG. 8A or 8B. The communication manager 932 further includes an SS switch component 948 that is configured to transmit an indication to switch to the first or second search space set group, e.g., as described in connection with 808 and/or 810 in FIG. 8B. The communication manager 932 further includes a BWP configuration component 950 that is configured to transmit an additional configuration of a capability for the PDCCH monitoring associated with a BWP, e.g., as described in connection with 804 FIG. 8B.

The apparatus 902 may include additional components that perform each of the blocks of the algorithm in the flowcharts of FIGS. 8A, 8B, and/or any of the aspects performed by the base station 504 in the communication flow 500 in FIG. 5. As such, each block in the flowcharts of FIGS. 8A, 8B, and/or any of the aspects performed by the base station 504 in the communication flow 500 in FIG. 5, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the baseband unit 904, includes means for receiving, from a UE, a capability for PDCCH monitoring; means for transmitting, to the UE, a configuration of a plurality of search space set groups based on the capability; and means for transmitting a PDCCH to the UE based on the search space set group and the configuration associated with the search space set group. The apparatus 902 may further include means for indicating for the UE to monitor the first search space set group and to use the first capability for the PDCCH monitoring associated with the first search space set group. The apparatus 902 may further include means for indicating for the UE to switch to the second search space set group and to use the second capability for the PDCCH monitoring associated with the second search space set group. The apparatus 902 may further include means for transmitting, to the UE, an additional configuration of a capability for the PDCCH monitoring associated with a BWP. The means may be one or more of the components of the apparatus 902 configured to perform the functions recited by the means. As described supra, the apparatus 902 may include the TX Processor 316, the RX Processor 370, and the controller/processor 375. As such, in one configuration, the means may be the TX Processor 316, the RX Processor 370, and the controller/processor 375 configured to perform the functions recited by the means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: transmitting, to a base station, an indication of a capability for PDCCH monitoring; receiving, from the base station, a configuration of a plurality of search space set groups based on the capability; and monitoring PDCCH candidates for a PDCCH from the base station based on a search space set group and the configuration.

In aspect 2, the method of aspect 1 further includes that the capability includes a PDCCH monitoring capability for one or more slots.

In aspect 3, the method of aspect 1 or aspect 2 further includes that the capability includes a maximum number of PDCCH candidates and non-overlapped CCEs per a time unit.

In aspect 4, the method of aspect 3 further includes that the time unit comprises one or more slots.

In aspect 5, the method of any of aspects 1-4 further includes that the capability includes a span based PDCCH monitoring capability having a separation between spans that is longer than a slot.

In aspect 6, the method of any of aspects 1-5 further includes that the UE indicates multiple capabilities for PDCCH monitoring to the base station.

In aspect 7, the method of aspect 6 further includes that the multiple capabilities include at least one of a different number of PDCCH candidates or a different number of non-overlapped CCEs for a different size of the time unit.

In aspect 8, the method of any of aspects 1-7 further includes that the UE receives a first configuration of a first search space set group associated with a first capability for the PDCCH monitoring and receives a second configuration of a second search space set group associated with a second capability for the PDCCH monitoring.

In aspect 9, the method of aspect 8 further includes receiving a first indication to switch to the first search space set group, wherein the UE monitors for the PDCCH based on the first capability associated with the first search space set group.

In aspect 10, the method of aspect 8 or aspect 9 further includes receiving a second indication to switch to the second search space set group; and monitoring for the PDCCH based on the second capability in response to switching to the second search space set group.

In aspect 11, the method of any of aspects 1-10 further includes receiving an additional configuration of a different capability for the PDCCH monitoring associated with a BWP, wherein the UE receives the configuration based on the PDCCH monitoring associated with the search space set group and not the different capability associated with the BWP.

In aspect 12, the method of aspect 11 further includes that the different capability includes a single slot based PDCCH monitoring capability or a span based PDCCH monitoring capability having a separation between spans that is less than a slot.

In aspect 13, the method of any of aspects 1-12 further includes that the UE receives the configuration for the PDCCH monitoring in a search space switch configuration.

In aspect 14, the method of any of aspects 1-13 further includes that the configuration comprises a monitoring capability configuration parameter.

In aspect 15, the method of any of aspects 1-14 further includes that the UE receives the configuration in RRC signaling from the base station.

Aspect 16 is an apparatus for wireless communication at a UE, comprising a memory; and at least one processor coupled to the memory and configured to perform the method of any of aspects 1-15.

In aspect 17, the apparatus of aspect 16 further includes at least one antenna coupled to the at least one processor.

In aspect 18, the apparatus of aspect 16 or aspect 17 further includes a transceiver coupled to the at least one processor.

Aspect 19 is an apparatus for wireless communication at a UE, comprising: means for performing the method of any of aspects 1-15.

In aspect 20, the apparatus of aspect 19 further includes at least one antenna.

In aspect 21, the apparatus of aspect 20 or aspect 21 further includes a transceiver.

Aspect 22 is a non-transitory computer-readable storage medium storing computer executable code for wireless communication at a UE, the code when executed by a processor causes the processor to perform the method of any of aspects 1-15.

Aspect 23 is a method of wireless communication at a base station, comprising: receiving, from a UE, an indication of a capability for PDCCH monitoring; transmitting, to the UE, a configuration of a plurality of search space set groups based on the capability; and transmitting a PDCCH to the UE based on a search space set group and the configuration associated with the search space set group.

In aspect 24, the method of aspect 23 further includes that the capability includes a PDCCH monitoring capability for one or more slots.

In aspect 25, the method of aspect 23 or aspect 24 further includes that the capability includes a maximum number of PDCCH candidates and non-overlapped CCEs per a time unit.

In aspect 26, the method of aspect 25 further includes that the time unit comprises one or more slots.

In aspect 27, the method of any of aspects 23-26 further includes that base station receives an indication of multiple capabilities from the UE, the multiple capabilities including at least one of a different number of PDCCH candidates or a different number of non-overlapped CCEs for a different size of the time unit.

In aspect 28, the method of any of aspects 23-27 further includes that the capability includes a span based PDCCH monitoring capability having a separation between spans that is longer than a slot.

In aspect 29, the method of any of aspects 23-28 further includes that the base station configures multiple search space set groups for the UE, each search space set group being associated with a different PDCCH monitoring capability.

In aspect 29, the method of any of aspects 22-28 further includes that the base station configures, for the UE, a first search space set group associated with a first capability for the PDCCH monitoring associated and configures, for the UE, a second search space set group associated with a second capability for the PDCCH monitoring.

In aspect 30, the method of aspect 29 further includes indicating for the UE to monitor the first search space set group and to use the first capability for the PDCCH monitoring associated with the first search space set group.

In aspect 31, the method of aspect 29 or aspect 30 further includes indicating for the UE to switch to the second search space set group and to use the second capability for the PDCCH monitoring associated with the second search space set group.

In aspect 32, the method of any of aspects 22-31 further includes transmitting, to the UE, an additional configuration of an additional capability for the PDCCH monitoring associated with a BWP, wherein the base station transmits the PDCCH to the UE based on the capability associated with the search space set group and not the BWP.

In aspect 33, the method of aspect 32 further includes that the additional capability includes a single slot based PDCCH monitoring capability or a span based PDCCH monitoring capability having a separation between spans that is less than a slot.

In aspect 34, the method of any of aspects 22-31 further includes that the base station configures the UE for the PDCCH monitoring associated with the search space set group and not an additional PDCCH monitoring configuration associated with a BWP.

In aspect 35, the method of any of aspects 22-34 further includes that the base station transmits the configuration for the PDCCH monitoring in a search space switch configuration.

In aspect 36, the method of any of aspects 22-35 further includes that the configuration comprises a monitoring capability configuration parameter.

In aspect 37, the method of any of aspects 22-36 further includes that the base station transmits the configuration in RRC signaling to the UE.

Aspect 38 is an apparatus for wireless communication at a base station, comprising: a memory; and at least one processor coupled to the memory and configured to perform the method of any of aspects 22-37.

In aspect 39, the apparatus of aspect 38 further includes at least one antenna coupled to the at least one processor.

In aspect 40, the apparatus of aspect 38 or aspect 39 further includes a transceiver coupled to the at least one processor.

Aspect 41 is an apparatus for wireless communication at a base station, comprising: means for performing the method of any of aspects 22-37.

In aspect 42, the apparatus of aspect 41 further includes at least one antenna.

In aspect 43, the apparatus of aspect 41 or aspect 42 further includes a transceiver.

Aspect 44 is a non-transitory computer-readable storage medium storing computer executable code for wireless communication at a base station, the code when executed by a processor causes the processor to perform the method of any of aspects 22-37.

What is claimed is:

1. An apparatus for wireless communication at a user equipment (UE), comprising:
   memory; and
   at least one processor coupled to the memory, the at least one processor configured to:
   transmit an indication of at least one capability supported by the UE for physical downlink control channel (PDCCH) monitoring;
   receive a configuration of a plurality of search space set groups based on the at least one capability, wherein the configuration of the plurality of search space set groups includes a first configuration of a first search space set group associated with a first capability for the PDCCH monitoring and a second configuration of a second search space set group associated with a second capability for the PDCCH monitoring;
   receive a first indication to switch to the first search space set group; and
   monitor PDCCH candidates for a PDCCH transmission based on the first search space set group and the first capability for the PDCCH monitoring associated with the first search space set group in the configuration.

2. The apparatus of claim 1, wherein the at least one capability includes a maximum number of PDCCH candidates and non-overlapped control channel elements (CCEs) per a time unit.

3. The apparatus of claim 2, wherein the time unit comprises one or more slots.

4. The apparatus of claim 2, wherein the indication indicates multiple capabilities for PDCCH monitoring.

5. The apparatus of claim 4, wherein the multiple capabilities include at least one of a different number of PDCCH candidates or a different number of non-overlapped CCEs for a different size of the time unit.

6. The apparatus of claim 1, wherein the at least one capability includes a span based PDCCH monitoring capability having a separation between spans that is longer than a slot.

7. The apparatus of claim 1, wherein the at least one processor is further configured to:
   switch to monitor for the PDCCH transmission based on the first capability associated with the first search space set group in response to the first indication.

8. The apparatus of claim 7, wherein the at least one processor is further configured to:
   receive a second indication to switch to the second search space set group; and
   monitor for the PDCCH transmission based on the second capability in response to switching to the second search space set group.

9. The apparatus of claim 1, wherein the at least one processor is further configured to:
   receive an additional configuration of a different capability for the PDCCH monitoring associated with a bandwidth part (BWP), the configuration based on the PDCCH monitoring being associated with a search space set group and not associated with the BWP.

10. The apparatus of claim 9, wherein the different capability includes a single slot based PDCCH monitoring capability or a span based PDCCH monitoring capability having a separation between spans that is less than a slot.

11. The apparatus of claim 1, wherein the configuration for the PDCCH monitoring is comprised in a search space switch configuration.

12. The apparatus of claim 11, wherein the configuration comprises a monitoring capability configuration parameter.

13. The apparatus of claim 11, wherein the configuration is comprised in radio resource control (RRC) signaling.

14. The apparatus of claim 1, further comprising:
   at least one antenna coupled to the at least one processor.

15. A method of wireless communication at a user equipment (UE), comprising:
   transmitting an indication of at least one capability supported by the UE for physical downlink control channel (PDCCH) monitoring;
   receiving a configuration of a plurality of search space set groups based on the at least one capability, wherein the configuration of the plurality of search space set groups includes a first configuration of a first search space set group associated with a first capability for the PDCCH monitoring and a second configuration of a second search space set group associated with a second capability for the PDCCH monitoring;
   receiving a first indication to switch to the first search space set group; and
   monitoring PDCCH candidates for a PDCCH transmission based on the first search space set group and the first capability for the PDCCH monitoring associated with the first search space set group in the configuration.

16. The method of claim 15, wherein the at least one capability includes a maximum number of PDCCH candidates and non-overlapped control channel elements (CCEs) per a time unit.

17. The method of claim 16, wherein the time unit comprises one or more slots.

18. The method of claim 16, wherein the UE indicates multiple capabilities for PDCCH monitoring.

19. The method of claim 18, wherein the multiple capabilities include at least one of a different number of PDCCH candidates or a different number of non-overlapped CCEs for a different size of the time unit.

20. An apparatus for wireless communication at a base station, comprising:
   memory; and
   at least one processor coupled to the memory, the at least one processor configured to:
   receive an indication of at least one capability supported by a user equipment (UE) for physical downlink control channel (PDCCH) monitoring;

transmit a configuration of a plurality of search space set groups for the UE based on the at least one capability, wherein the configuration of the plurality of search space set groups includes a first configuration of a first search space set group associated with a first capability for the PDCCH monitoring and a second configuration of a second search space set group associated with a second capability for the PDCCH monitoring;

transmit a first indication for the UE to switch to the first search space set group; and transmit a PDCCH transmission for the UE based on the first search space set group and the first capability for the PDCCH monitoring associated with the first search space set group in the configuration.

21. The apparatus of claim 20, wherein the at least one capability includes a maximum number of PDCCH candidates and non-overlapped control channel elements (CCEs) per a time unit.

22. The apparatus of claim 21, wherein the time unit comprises one or more slots.

23. The apparatus of claim 21, wherein the indication indicates multiple capabilities for PDCCH monitoring.

24. The apparatus of claim 23, wherein the multiple capabilities include at least one of a different number of PDCCH candidates or a different number of non-overlapped CCEs for a different size of the time unit.

25. The apparatus of claim 20, wherein the at least one capability includes a span based PDCCH monitoring capability having a separation between spans that is longer than a slot.

26. The apparatus of claim 20, wherein each of the plurality of search space set groups is associated with a different PDCCH monitoring capability.

27. The apparatus of claim 20, further comprising:
at least one antenna coupled to the at least one processor.

28. A method of wireless communication at a base station, comprising:

receiving an indication of at least one capability supported by a user equipment (UE) for physical downlink control channel (PDCCH) monitoring;

transmitting a configuration of a plurality of search space set groups for the UE based on the at least one capability, wherein the configuration of the plurality of search space set groups includes a first configuration of a first search space set group associated with a first capability for the PDCCH monitoring and a second configuration of a second search space set group associated with a second capability for the PDCCH monitoring;

transmitting a first indication for the UE to switch to the first search space set group; and transmitting a PDCCH transmission for the UE based on the first search space set group and the first capability for the PDCCH monitoring associated with the first search space set group in the configuration.

29. The method of claim 28, wherein the at least one capability includes a maximum number of PDCCH candidates and non-overlapped control channel elements (CCEs) per a time unit.

* * * * *